United States Patent
Gummalla et al.

(10) Patent No.: US 7,660,304 B2
(45) Date of Patent: Feb. 9, 2010

(54) POINT-TO MULTIPOINT NETWORK INTERFACE

(75) Inventors: Ajay Chandra V. Gummalla, Atlanta, GA (US); John O. Limb, Atlanta, GA (US)

(73) Assignee: Broadcom Corporation, Irvine, CA (US)

( * ) Notice: Subject to any disclaimer, the term of this patent is extended or adjusted under 35 U.S.C. 154(b) by 541 days.

(21) Appl. No.: 11/386,692

(22) Filed: Mar. 23, 2006

(65) Prior Publication Data
US 2006/0159094 A1 Jul. 20, 2006

Related U.S. Application Data

(63) Continuation of application No. 09/978,087, filed on Oct. 17, 2001, now Pat. No. 7,046,664.

(51) Int. Cl.
*H04L 12/28* (2006.01)
(52) U.S. Cl. .................................. 370/391; 370/487
(58) Field of Classification Search ........................ None
See application file for complete search history.

(56) References Cited

U.S. PATENT DOCUMENTS

| | | | |
|---|---|---|---|
| 5,936,963 | A | 8/1999 | Saussy |
| 6,072,797 | A * | 6/2000 | Fletcher ..................... 370/394 |
| 6,226,292 | B1 | 5/2001 | Diplacido |
| 2001/0003528 | A1* | 6/2001 | Matsumura ................. 370/535 |
| 2001/0012293 | A1* | 8/2001 | Petersen et al. ............. 370/389 |
| 2002/0196802 | A1* | 12/2002 | Sakov et al. ................ 370/432 |

FOREIGN PATENT DOCUMENTS

WO 99/22496 5/1999

OTHER PUBLICATIONS

Woodward et al., "First Demonstration of Native Ethernet Optical Transport System Prototype At 10GB/S Based On Multiplexing Of Gigabit Ethernet Signals", *IEEE Photonics Technology Letters*, IEEE Inc., New York, vol. 12, No. 8, Aug. 2000, pp. 1100-1102.
Saunders, S., "Multiplexer Builds in Ethernet Bridge", *Data Communications*, McGraw Hill, New York, vol. 19, No. 6, May 1990, pp. 87-88.
European Search Report issued by the European Patent Office in EP Appl. No. 02 25 7215,dated Jan. 23, 2003.

* cited by examiner

*Primary Examiner*—Jayanti K Patel
*Assistant Examiner*—Jung Park
(74) *Attorney, Agent, or Firm*—Sterne, Kessler, Goldstein & Fox P.L.L.C.

(57) ABSTRACT

A point-to-multipoint network interface is provided that is simpler and less costly to implement than conventional Ethernet switches. The interface includes a plurality of downstream transmitters for transmitting data packets to a plurality of end user devices, a plurality of downstream receivers for receiving data packets from the plurality of end user devices, an upstream transmitter and an upstream receiver. A multiplexer within the interface multiplexes data packets received from the end user devices into a stream of data packets for transmission to a higher level node regardless of the destination address of the data packets. Conversely, a demultiplexer within the interface demultiplexes a stream of data packets received from the higher level node into individual data packets for selective transmission to one of the plurality of end user devices. The interface can support asymmetrical transmission rates on the upstream and downstream channels between the interface and the end user devices.

16 Claims, 11 Drawing Sheets

POINT-TO MULTIPOINT NETWORK INTERFACE

CROSS REFERENCE TO RELATED APPLICATIONS

This application is a continuation of application Ser. No. 09/978,087, now Pat. No. 7,046,664, filed Oct. 17, 2001, which is incorporated herein by reference.

BACKGROUND OF THE INVENTION

1. Field of the Invention

The present invention is directed to data networks. More particularly, the present invention is directed to an interface and method for transferring data over a data network, such as an access network.

2. Background

The term "access network," as used herein, refers to a data network that connects a service provider to multiple end users, such as individuals, businesses and other organizations, for the delivery of voice, video and data services. Within an access network, the transfer of data from a service provider to the end users may be generally described as "downstream" communication and, conversely, the transfer of data from the end users to the service provider may be generally described as "upstream" communication. In conventional access networks, the service provider typically also provides end users with a portal to one or more other data networks, such as a wide area network or metropolitan area network.

Various technologies have been used to deliver data over access networks. For example, the two technologies most commonly used today rely on physical links that have existed for many decades. The oldest medium is twisted pair, which includes the standard copper wire that connects most homes to a local telephone company. Sophisticated technology has been used to deliver data over long twisted pair loops at speeds of 1 Mbps (megabit per second) and over shorter lengths at rates up to tens of Mbps. The other commonly-used medium is coaxial cable, upon which data is transferred using specially-designed cable modems. This technique permits data rates up to approximately 100 Mbps. However, because of the broadcast nature of cable modem networks, this capacity must be shared between a number of active users. For example, as many as 50 or more users may be required to share this bandwidth in a cable modem system.

Extending these two traditional methods to permit higher data rates would require considerable effort. Thus, if higher data rates are desired, other technologies must be explored. A technique that is now being widely considered is to implement an access network using Ethernet technology. Because Ethernet technology has been extensively developed for use in enterprise networks such as Local Area Networks (LANs), Ethernet Systems and chipsets now comprise the most inexpensive link layer technology available. Moreover, it has been observed that Ethernet technology may be advantageously used in access networks that include fiberoptic cable to provide higher transmission rates over longer distances.

One possible architecture for an Ethernet-based access network involves providing multiple point-to-point connections through the installation of a dedicated fiber optic cable between the service provider facility and each end user location. Such an architecture provides a number of advantages. For example, because a network of dedicated fiber optic cables may consist entirely of passive elements, very little network maintenance is required. This is in contrast to other types of access networks, such as a hybrid-fiber coaxial (HFC) network, which includes many active elements (such as filters and amplifiers) that must be periodically tested and adjusted to maintain system performance. Furthermore, in a network of dedicated fiber optic cables, system upgrades may be achieved by simply modifying the electronics at the service provider facility and/or the end user locations, while avoiding modification of intervening components. Unfortunately, the cost of deploying such an architecture may be prohibitively expensive, as it requires the installation of very large amount of fiber optic cable before service may be provided.

An alternate architecture for an Ethernet-based access network includes at least one active element relatively close to the home (e.g., about a kilometer to the home). The active element is an Ethernet switch that provides a point-to-multipoint interface between a single link to the service provider facility and a plurality of dedicated cables each of which is connected to a different end user location. For example, FIG. 1 shows a portion of an access network 100 in which an Ethernet switch 102 is utilized to transfer data packets between a plurality of end-user devices 104a-104n and a higher level node 110 within the access network. The Ethernet switch 102 is connected to the end user devices 104a-104n through copper or fiber optic cables 106a-106n, respectively, and is connected to the higher level node 110 via a single fiber optic cable 108. For the purposes of this example, it will be assumed that the higher level node 110 is the service provider facility; however, the higher level node 110 may also be another interface within the access network, such as a hub, an optical node, or another Ethernet switch.

This alternate architecture is less expensive than the previously described Ethernet-based architecture, as it requires the installation of considerably less cable. For example, as shown in FIG. 1, only a single fiber optic cable 108 is required to connect the service provider facility to the Ethernet switch 102, while dedicated cables 106a-106n are required only for the short distance between the Ethernet switch 102 and the end user locations. Furthermore, this alternate architecture is advantageous because it permits the upstream link from the end user-devices 104a-104n to the Ethernet switch 102 to be operated at a lower transmission rate than the upstream link from the Ethernet switch 102 to the higher level node 110. This is because the upstream bandwidth requirements for each end user device 104a-104n are considerably less than that of the Ethernet switch 102, which must accommodate the combined upstream bandwidth requirements of all the end user devices 104a-104n. Because the upstream link from the Ethernet switch 102 to the end user devices 104a-104n may be run at a lower transmission rate, cheaper components may be used to implement the cables 106a-106n and the end user devices 104a-104n.

It has been observed, however, that conventional Ethernet devices, such as the conventional Ethernet switch 102, are not ideally suited for providing a point-to-multipoint interface within an access network. For example, conventional Ethernet switches provide costly switching functionality that may provide little benefit in an access network. Additionally, conventional Ethernet switches transmit data at the same rate from all ports, and therefore are not well-suited for access networks in which bandwidth requirements may be different in the upstream and downstream direction. These concepts may be best explained with reference to FIG. 2, which depicts an example implementation of the Ethernet switch 102 described in reference to FIG. 1 above.

As shown in FIG. 2, Ethernet switch 102 includes a plurality of transceivers 202a-202n for transmitting and receiving data over downstream links 106a-106n, respectively. Data received over downstream links 106a-106n may be temporarily queued in a corresponding receive buffer 206a-206n, while data to be transmitted over downstream links 106a-106n may be temporarily queued in a corresponding transmit buffer 204a-204n. Ethernet switch 102 also includes a transceiver 218 for transmitting and receiving data over upstream link 108. Data received over upstream link 108 may be temporarily queued in a receive buffer 216 and data to be transmitted over upstream link 108 may be temporarily queued in a transmit buffer 214.

In accordance with the example implementation of FIG. 2, Ethernet packets received on any upstream or downstream link may be routed for transmission over any other link, or for simultaneous transmission over any combination of other links. For example, an Ethernet packet may be received and queued in any one of receive-buffers 206a-206n or receive buffer 216. Control logic 210 is configured to schedule the serving of packets in these receive buffers according to a predetermined algorithm. For example, the control logic 210 may serve a packet at the head of a queue within each receive buffer, rotating sequentially in a round-robin fashion among the buffers. In accordance with this algorithm, the control logic 210 examines the header of each Ethernet packet and determines if it can be served. If it cannot be served, the control logic 210 passes to the next receive buffer in turn and attempts to serve the packet at the head of its queue.

When a packet is ready to be served, routing logic 212 examines the header of the Ethernet packet and, based on the destination address within the packet header, determines which link to route the packet to for transmission and routes the packet to the appropriate transmit buffer servicing that link. The destination link may be any of the output links 106a-106n or 108, or any combination of these links. The switching fabric 208 provides the physical interconnection between the receive buffer and each appropriate transmit buffer. Once the Ethernet packet has, been transferred to an appropriate transmit buffer via the switching fabric 208, it may then be transmitted out of the Ethernet switch 102.

Because the conventional Ethernet switch 102 permits packets received on any link to be transmitted out over any other link(s), the switching fabric 208 and the routing logic 212 are necessarily complex. This complexity translates to an increased implementation cost for the switch. As will be appreciated, the cost of the Ethernet switch is significant since, apart from the end user devices, it is the device required in the greatest numbers for deploying the above-described access network. Accordingly, what is desired is a point-to-multipoint interface device for access networks that manages the transfer of data between a plurality of end user devices and a higher level node, yet is less expensive to implement than conventional Ethernet switches. For example, the desired point-to-multipoint interface should manage the transfer of data between a plurality of end user devices and a higher level node without requiring switching fabric and/or complex routing logic as used in conventional Ethernet switches.

Additionally, conventional Ethernet switches such as conventional Ethernet switch 102 support only identical transmit and receive rates from each port. This means that the rate at which data is transmitted to each end user device must be identical to the rate at which data is received from each end user device. However, in many access networks, the downstream bandwidth requirements are substantially higher than the upstream bandwidth requirements. This is true, for example, where the access network is used to provide broadcast video services from the service provider to the end users. In theory, this asymmetrical aspect of access networks could be exploited if the Ethernet switch permitted the use of slower, and therefore cheaper, transmitters and receivers on the upstream link from the end user devices, and higher-speed transmitters and receivers on the downstream link. Unfortunately, conventional Ethernet switches do not provide this capability. Accordingly, the desired point-to-multipoint interface device should also provide for different rates of transmission and reception from the same port, such that different, upstream and downstream transmission rates may be supported over the same link.

BRIEF SUMMARY OF THE INVENTION

Embodiments of the present invention take advantage of the fact that, in an access network, the amount of data packets that passes directly from one end user device to another end user device connected to the same Ethernet switch constitutes a very small percentage of the total traffic handled by the network. In fact, research has shown that this traffic represents approximately 1% of all the traffic on the network. The majority of traffic is directed upstream to the service provider and to the wide area network to which the service provider provides access (e.g., to web servers, mail servers, music servers, or file servers). Accordingly, a point-to-multipoint interface in accordance with embodiments of the present invention does not perform the functions necessary to permit data packets received from any of the end user devices to which it is coupled to be directly routed to any of the other end user devices to which it is coupled. Rather, all data packets received from the end user devices are directed over the upstream channel to a higher level node. The higher level node, or some other higher level node within the access network to which it is connected, provides the appropriate routing and switching functionality such that data packets received from any end-user device coupled to the interface may be transmitted back downstream to any other end-user device coupled to the interface. This permits a more simplified design of point-to-multipoint interface than that provided by conventional network interface devices such as Ethernet switches.

Embodiments of the present invention also take advantage of the fact that in many access networks, the downstream bandwidth requirements are substantially higher than the upstream, bandwidth requirements. A point-to-multipoint interface in accordance with embodiments of the present invention exploit this asymmetrical aspect of access networks by permitting the use of slower, and therefore cheaper, transmitters and receivers oft the upstream link from the end user devices, and higher-speed transmitters and receivers on the downstream link.

Accordingly, the present invention is directed to a point-to-multipoint, network interface for transferring data packets between a plurality of end user devices and a higher level node, wherein each of the data packets includes a destination address. In an embodiment of the invention, the point-to-multipoint network interface includes a plurality of downstream transmitters, each of which receives data packets from a respective one of the plurality of end user devices, a multiplexer that multiplexes the data packets received by the plurality of downstream receivers into a first stream of data packets, and an upstream transmitter that transmits the first stream of data packets to the higher level node regardless of the destination address of the data packets in the first stream of data packets. The interface further includes an upstream receiver that receives a second stream of data packets from the higher level node, a demultiplexer, and a plurality of downstream transmitters. The demultiplexer demultiplexes the second stream of data packets into individual data packets and selectively provides each of the individual data packets to one of the plurality of downstream transmitters for transmission to a respective one of the plurality of end user devices.

In embodiments, the aforementioned multiplexer includes a packet memory that stores data packets received by the plurality of downstream receivers and a header processor that arbitrates the storage of those data packets in the packet memory and controls the writing of the data packets stored in the packet memory to the upstream transmitter to generate the first stream of data packets.

In further embodiments, the aforementioned demultiplexer includes a packet memory that stores individual data packets from the second stream of data packets and a packet distributor that reads the destination address of each of the individual data packets stored in the packet memory and, based on the destination address of each of the individual data packets, selectively routes each of the individual data packets to one of the plurality of downstream transmitters for transmission to at respective one of the plurality of end user devices. Alternately, the aforementioned demultiplexer may include a packet memory that stores individual data packets from the second stream of data packets and a header processor that reads a hardware address from the header of each of the individual data packets, and, based on the hardware address of each of the individual data packets, selectively controls the packet memory to output each of the individual data packets to one of the plurality of downstream transmitters for transmission to a respective one of the plurality of end user devices.

In still further embodiments, at least one of the plurality of downstream receivers of the point-to-multipoint network interface receives data packets at a different rate than the rate at which at least one of the plurality of downstream transmitters transmits data packets.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
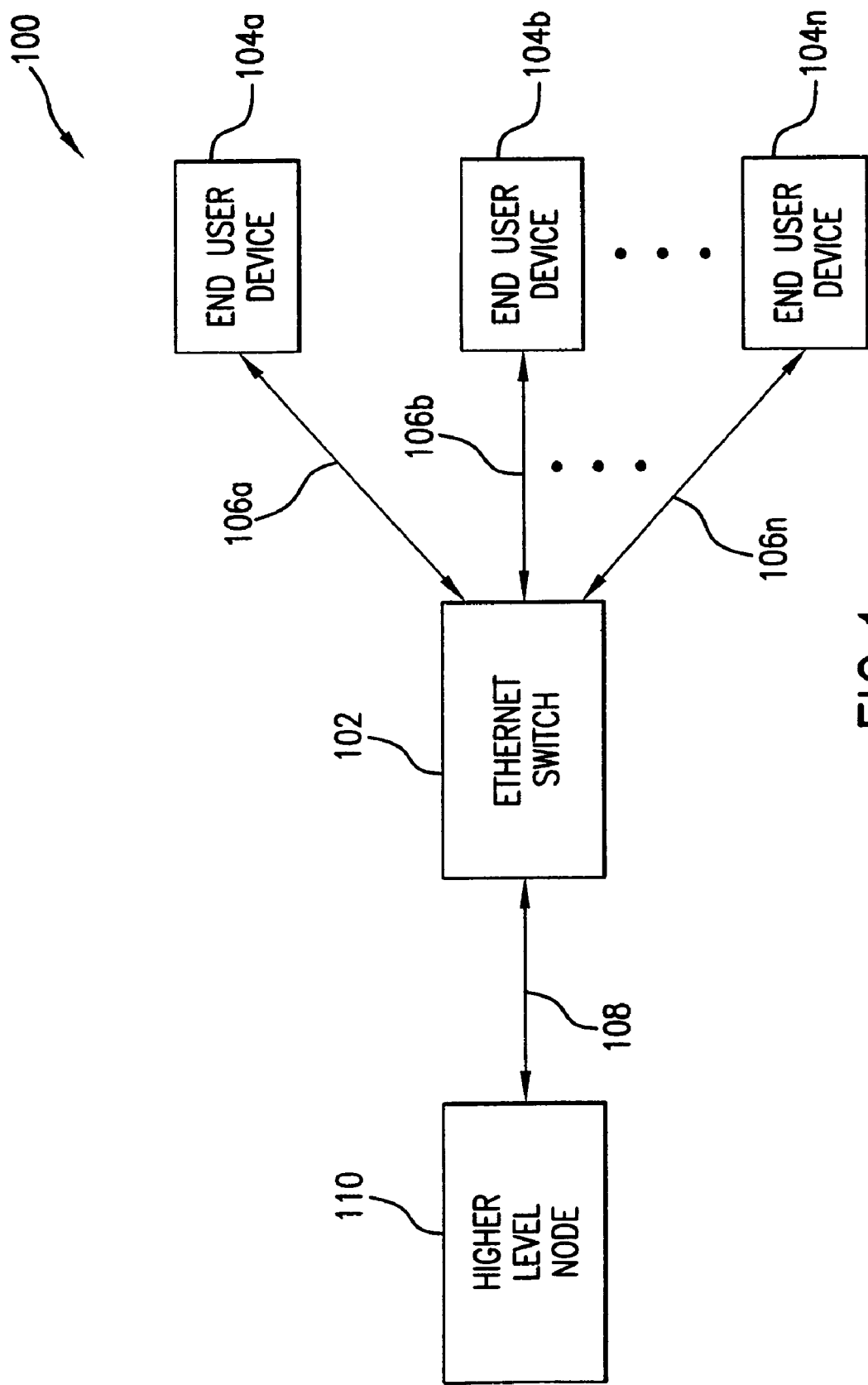
FIG. 1 depicts a portion of a conventional access network.
Figure 2:
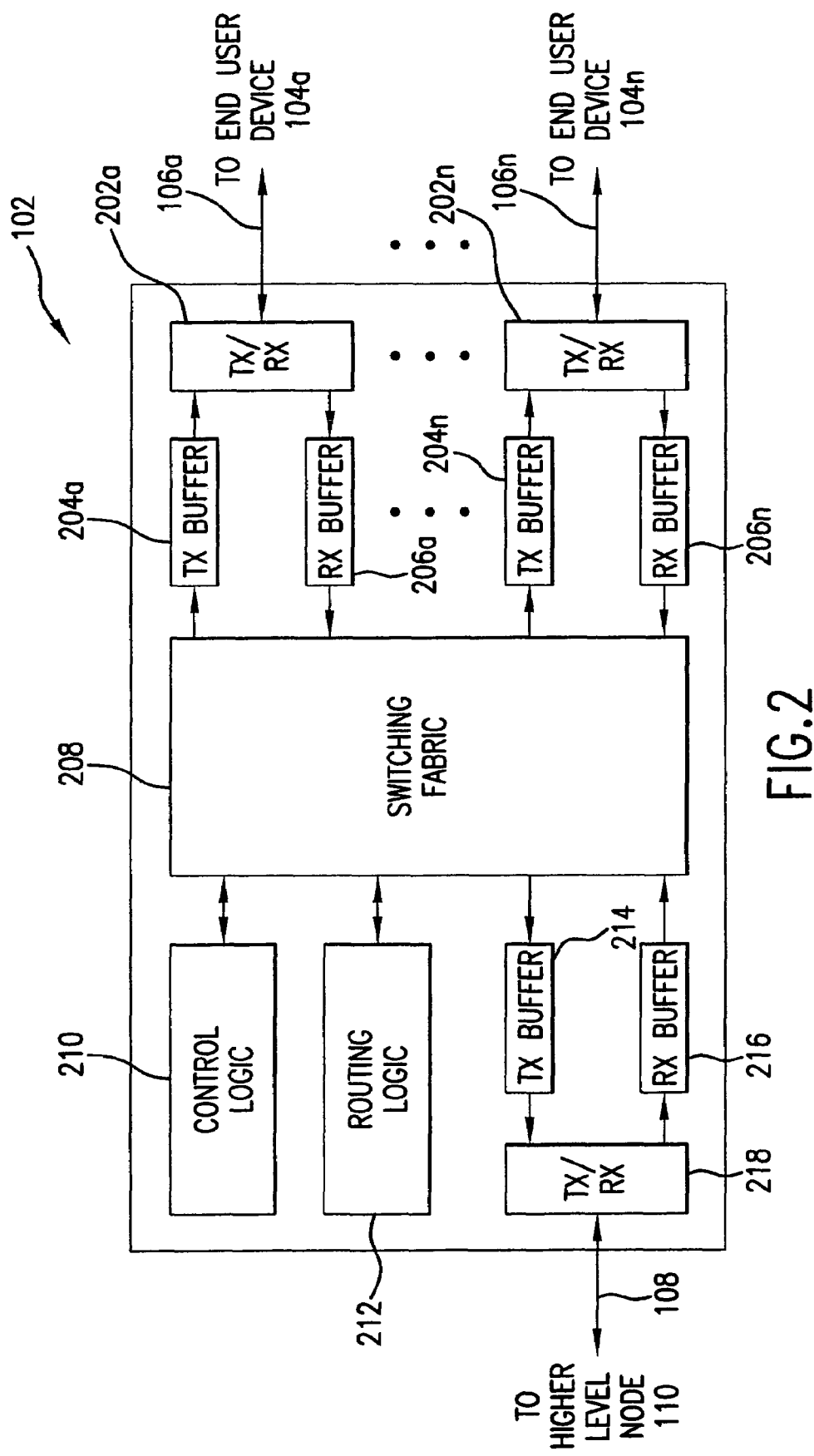
FIG. 2 illustrates an example implementation of a conventional Ethernet switch.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents

A. Access Network in Accordance with Embodiments of the Present Invention

Figure 3:
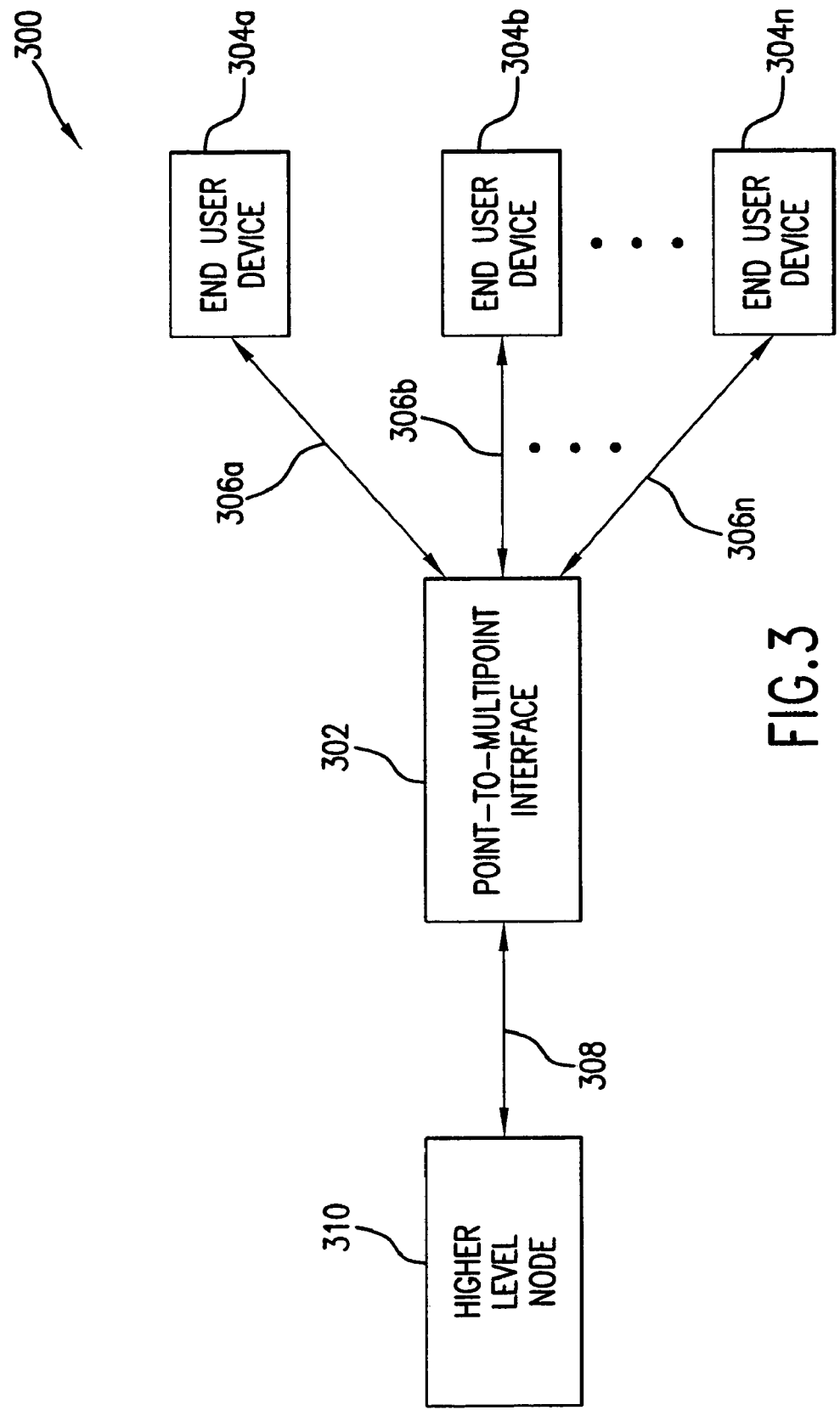
FIGS. 3 and 4 depict a portion of an access network in accordance with embodiments of the invention.

B. Point-to-Multipoint Interface in Accordance with Embodiments of the Present Invention 1. Upstream Communication 2. Downstream Communication C. Asymmetric Communication Rates in Accordance with Embodiments of the Present Invention D. Conclusion, A. Access Network in Accordance with Embodiments of the Present Invention FIG. 3 illustrates a portion of an access network 300 in accordance with embodiments of the present invention in which a point-to-multipoint interface 302 manages the bi-directional transfer of data between a plurality of end user devices 304a-304n and a higher level node 310. The point-to-multipoint interface 302 is connected to the end user devices 304a-304n through cables 306a-306n, respectively, each of which may comprise copper wire, fiber optic cable, coaxial cable, or any other appropriate medium for transmitting data as will be appreciated by persons skilled in the art. The point-to-multipoint interface 302 is further connected to the higher level node 310 via a single cable 308. In embodiments, the cable 308 comprises fiber optic cable. However, the cable 308 may alternately comprise copper wire, coaxial cable, or any other medium appropriate for transmitting data as will be appreciated by persons skilled in the art.

In accordance with embodiments of the present invention, the point-to-multipoint interface 302 receives data packets from one or more of the end user devices 304a-304n, multiplexes them into a single stream of data packets, and transmits them upstream to the higher level node 310. Conversely, the point-to-multipoint interface 302 receives a single stream of data packets from the higher level node 310, demultiplexes the data packets, and, when appropriate, transmits each demultiplexed data packet downstream to one or more of the end user devices 304a-304n based, upon its destination address or other routing information. In embodiments, the data packets are Ethernet packets transmitted in accordance with the well-known IEEE 802.3 standard and protocols. The manner by which the point-to-multipoint interface 302 receives, transmits, multiplexes, and demultiplexes data packets will be described in more detail below.

Notably, the point-to-multipoint interface 302 does not perform the functions necessary to permit data packets received from any of the end user devices 304a-304n to be directly routed to any of the other end user devices 304a-304n. Rather, in accordance with embodiments of the present invention, all data packets received from the end user devices 304a-304n are directed over the upstream link 308 to the higher level node 310. The higher level node 310, or some other higher level node within the access network to which it is connected, provides the appropriate routing and switching functionality such that data packets received from any end-user device 304a-304n may be transmitted back downstream to any other end-user device 304a-304n. This aspect of the access network 300 permits amore simplified design of point-to-multipoint interface 302 than that provided by conventional network interface devices such as Ethernet switches.

The end user devices 304a-304n depicted in FIG. 3 may each comprise a personal computer, data terminal equipment, VoIP-enabled phone, broadband media player, audio equipment, video equipment, or any other device configured to send and receive data packets over the access network. In embodiments, the end user devices 304a-304n each include an Ethernet interface card for sending and receiving Ethernet data packets over the access network, such as a 10BASE-T or 100BASE-T Ethernet card.

The higher level node 310 may comprise a service provider facility that provides voice communications, video and/or data services to the plurality of end user devices 304a-304n over the access network. Additionally, the service provider facility may provide a portal to one or more other networks, such as a wide area network or metropolitan network, such that any end user device may transmit data packets upstream to the service provider facility for transmission to the other network(s).

Figure 4:
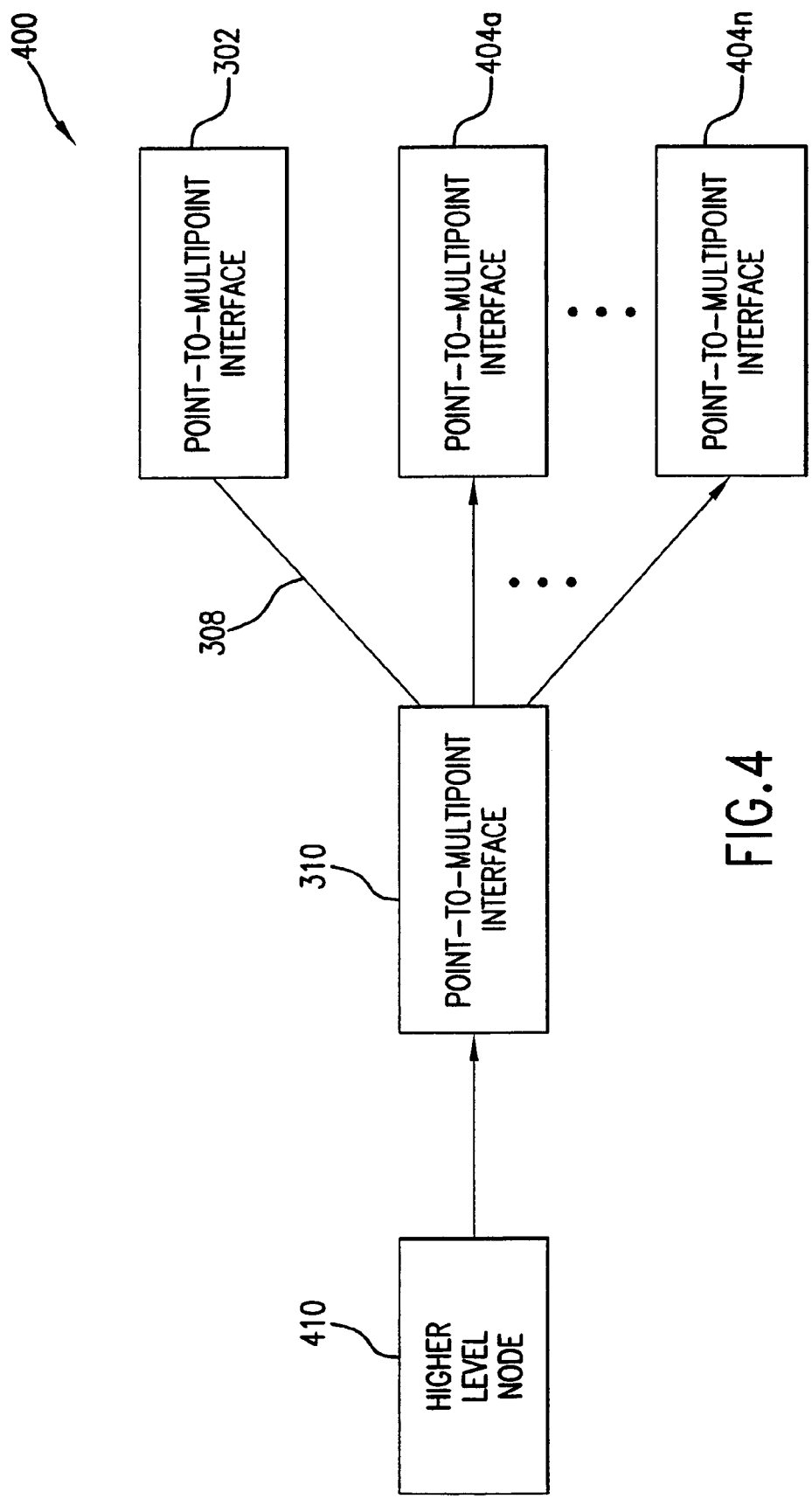

In alternate embodiments, the higher level node 310 may comprise another point-to-multipoint interface similar to point-to-multipoint interface 302. For example, FIG. 4 illustrates a portion of an access network 400 in accordance with embodiments of the present invention in which the higher level node 310 is a point-to-multipoint interface similar to point-to-multipoint interface 302. As shown in FIG. 4, the point-to-multipoint interface 310 may actually be connected in the downstream direction to a plurality of point-to-multipoint interfaces 404a-404n (in addition to point-to-multipoint interface 302), each of which, in turn, is connected to a plurality of end user devices (not shown in FIG. 4).

In the example network shown in FIG. 4, the point-to-multipoint interface 310 receives data packets from one or more of the point-to-multipoint interfaces 302 and 404a-404n, multiplexes them into a single stream of data packets, and transmits them upstream to the higher level node 410. Conversely, the point-to-multipoint interface 310 receives a single stream of data packets from the higher level node 410, demultiplexes the packets, and, when appropriate, routes each demultiplexed packet downstream to one or more of the point-to-multipoint interfaces 302 and 404a-404n based upon its destination address or other routing information. In embodiments, the data packets are Ethernet packets transmitted in accordance with the well-known IEEE 802.3 standard and protocols.

The higher level node 410 in FIG. 4 may represent a service provider facility or another point-to-multipoint interface similar to point-to-multipoint interface 302. As will be appreciated by persons skilled in the art, by stacking, point-to-multipoint interfaces in the manner shown in FIG. 4, any number of hierarchical levels of these devices may be flexibly utilized in an access network for directing upstream and downstream traffic over a variety of network configurations.

Figure 5:
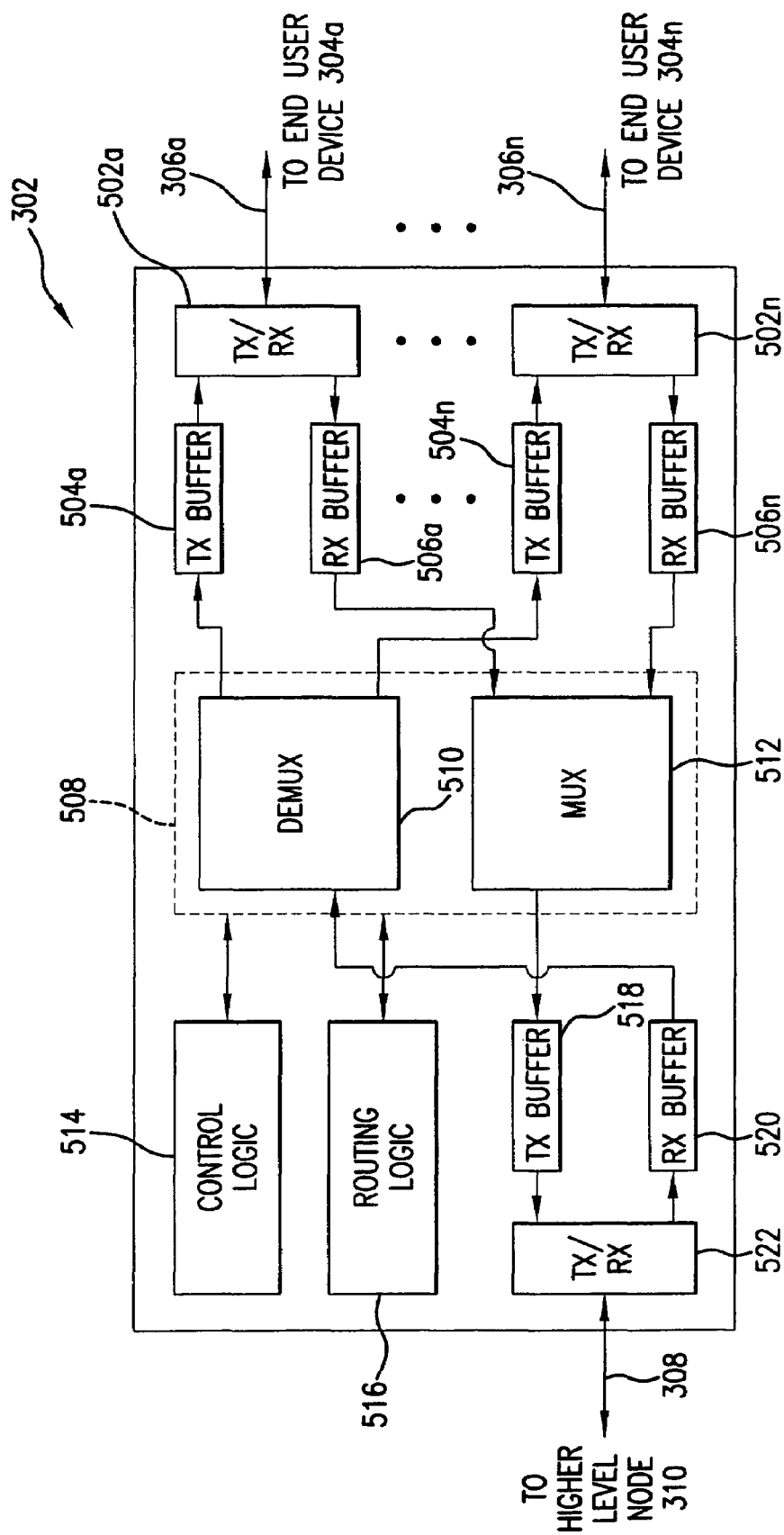
FIG. 5 illustrates a point-to-multipoint network interface in accordance with embodiments of the present invention.

B. Point-to-Multipoint Interface in Accordance with Embodiments of the Present Invention FIG. 5 depicts an example implementation of the point-to-multipoint interface 302 discussed in regard to FIG. 3, above. As shown in FIG. 5, the example implementation of the point-to-multipoint interface 302 includes a number of interconnected components including a plurality of transceivers 502a-502n and 522, a plurality of receive buffers 506a-506n and 520, a plurality of transmit buffers 504a-504n and 518, a mux/demux module 508, control logic 514, and routing logic 516.

Each of the plurality of transceivers 502a-502n and 522 represents a standard device for sending and receiving data packets over the physical layer of an access network, such as over fiber-optic, copper or coaxial cable, as will be appreciated by persons skilled in the art. In particular, each of the transceivers 502a-502n is configured to send and receive data packets over a corresponding downstream link 306a-306n. Similarly, the transceiver 522 is configured to send and receive data packets over an upstream link 308. In embodiments, each transceiver 502a-502n and 522 comprises a receiver and a transmitter portion (not shown in FIG. 3) for receiving and transmitting data packets, respectively.

Each transceiver 502a-502n is coupled to a corresponding receive buffer 506a-506n that temporarily stores received data packets prior to processing by the point-to-multipoint interface 302, and to a corresponding transmit buffer 504a-504n that temporarily stores data packets for transmission after processing by the point-to-multipoint interface 302. In a like fashion, the transceiver 522 is coupled to a receive buffer 520 and a transmit buffer 518 for the temporary storage of received data packets and data packets for transmission, respectively. The receive and transmit buffers of the point-to-multipoint interface 302 may comprise any suitable memory device or combination of memory devices for the temporary storage of data packets including, but not limited to, one or more semiconductor memory devices such as a dual-ported SRAM.

As will be described in more detail herein, the mux/demux module 508 operates to receive data packets from each of the receive buffers 506a-506n, multiplex them into a single stream of data packets, and provide them to the transmit buffer 518 for transmission by transceiver 522 over the upstream link 308. The mux/demux module 508 also receives data packets from the receive buffer 520, demultiplexes the data packets, and when appropriate, provides each data packet to one or more of the transmit buffers 504a-504n, depending upon its destination address or other routing information, for transmission over one or more links. In the embodiment depicted in FIG. 5, the demultiplexing function receives routing input from the routing logic 516, to which the mux/demux module 508 is connected.

It should be noted that, depending on the upstream and downstream transmission rates of the point-to-multipoint interface 302, alternate embodiments of the present invention need not utilize receive buffers and/or transmit buffers in the upstream and/or downstream directions. For example, receive buffers may not be required where packets are processed by the point-to-multipoint interface 302 more quickly than they are received, and transmit buffers may not be required where packets are transmitted by the point-to-multipoint interface 302 more quickly than they are processed.

Control logic 514 comprises logic that performs high-level administrative functions within the point-to-multipoint interface 302. For example, control logic 514 may enable or disable input/output ports to one or more of the downstream links 306a-306n. In embodiments, the control logic 514 is responsive to a higher-level entity within the access network 300 (not shown in FIG. 3) for carrying out administrative functions within the point-to-multipoint interface 302.

The operation of the point-to-multipoint interface 302 will now be further described in reference to/an upstream communication path, which generally describes the transfer of data from the plurality of end user devices 304a-304n to the higher level node 308, and in reference to a downstream communication path, which generally describes the transfer of data from the higher level node 308 to the plurality of end user devices 304a-304n.

1. Upstream Communication

Figure 6:
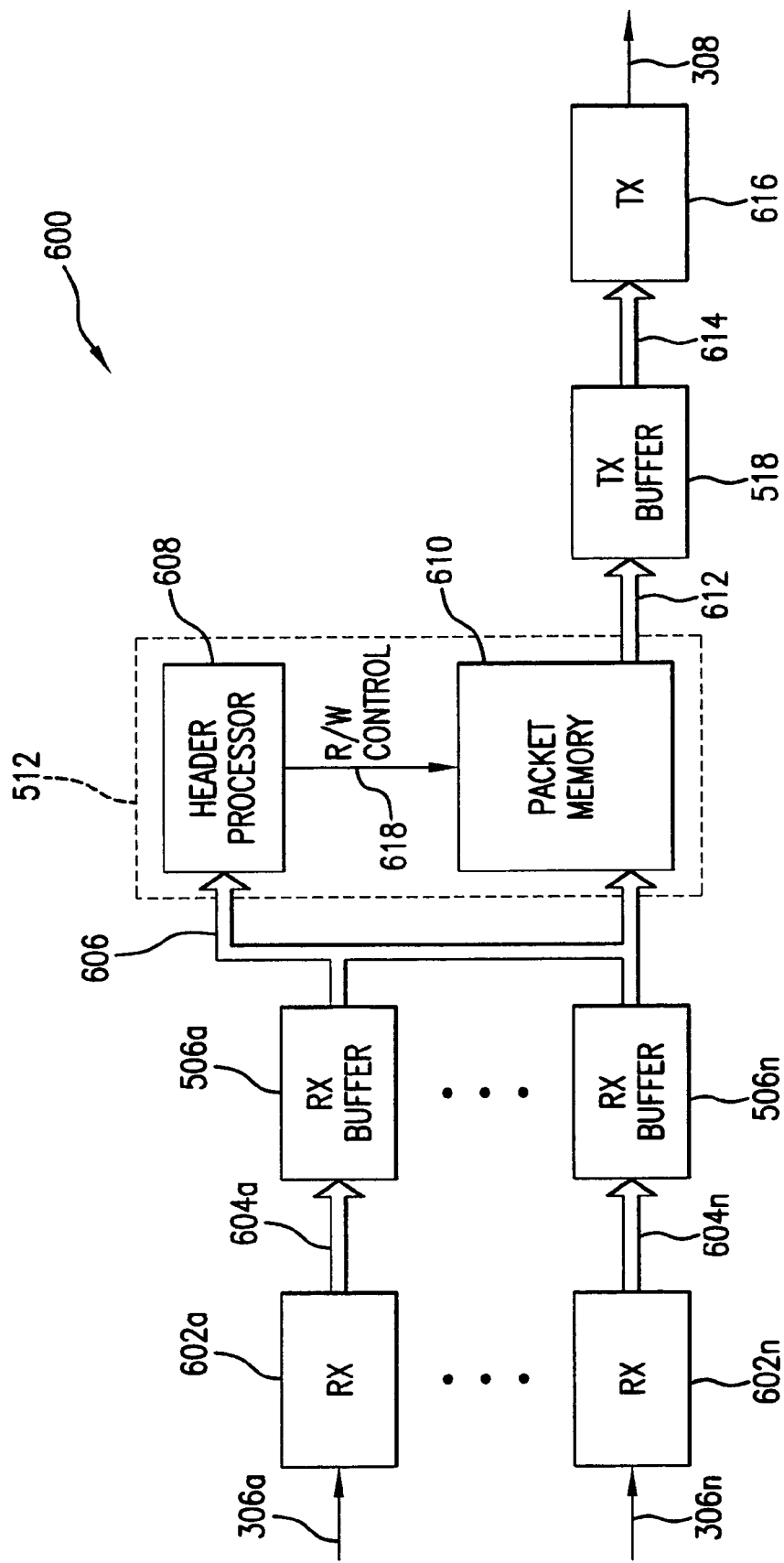
FIG. 6 depicts an upstream communication path of a point-to-multipoint network interface in accordance with embodiments of the present invention.

FIG. 6 depicts the upstream communication path of point-to-multipoint interface 302. The upstream path begins with the receipt of data packets by the plurality of receivers 602a-602n from downstream links 306a-306n, respectively. The receivers 602a-602n, each comprise a portion of transceivers 502a-502n as described above in reference to FIG. 5. Data packets are received by the receivers 602a-602n as a serial data stream, demodulated, and output as a series of words on a corresponding parallel word-wide bus 604a-604n. In embodiments, each parallel word-wide bus 604a-604n is 8 bits wide. In alternate embodiments, each parallel word-wide bus 604a-604n has a width that is some multiple of 8 bits, such as 16 bits or 32 bits. However, any width bus is contemplated.

Data packets output by each receiver 602a-602n are received by a corresponding receive buffer 506a-506n, which operates to temporarily store the packets, or a portion of the packets, prior to delivery to the multiplexer 512. Buffering of the received data packets permits the multiplexer 512 to arbitrate delivery of data packets from each of the receive buffers 506a-506n to the multiplexer 512. Arbitration is necessary because multiple receivers cannot be permitted to deliver data packets to the multiplexer 512 at the same time. Furthermore, buffering serves to temporarily store overflow data when the rate at which data packets are received exceeds the rate at which data packets may be processed by multiplexer 512. In embodiments, each of the receive buffers 506a-506n may be implemented as a first-in-first-out (FIFO) buffer.

The multiplexer 512 comprises a header processor 608 and a packet memory 610. The header processor 608 determines when data packets may be received from each of the receive buffers 506a-506n for storage in the packet memory 610, and when data packets stored in the packet memory 610 may be transmitted to the transmit buffer 518. The header processor 608 controls these read/write operations by means of a read/write control signal 618, as shown in FIG. 6. In embodiments, the header processor 608 may comprise a microcontroller configured to perform these functions. In such an, embodiment, the header processor 608 may also comprise a memory, such as a read-only memory (ROM), for storing the necessary program instructions for the microcontroller. In alternate embodiments, the header processor may comprise custom circuitry for performing these functions.

The header processor 608 monitors the receive buffers 506a-506n and determines when a data packet may be read out from one of the receive buffers 506a-506n into the packet memory 610 in accordance with a predetermined scheduling-technique. For example, the header processor 608 may arbitrate the transfer of data packets from the receive buffers 506a-506n to the packet memory 610 using a round-robin technique. In accordance with such a technique, the header processor 608 determines if a first receive buffer is ready to transfer a data packet to the packet memory 610. If so, the header processor 608 generates a read/write control signal 618 that causes the packet memory 610 to receive the data packet from the receive buffer. The header processor 608 then passes to a next receive buffer and performs the same steps, rotating sequentially in a round-robin fashions among ties receive buffers. However, this example is not limiting, and a variety of other arbitration techniques may be used to control the transfer of data packets from the receive buffers 506a-506 to, the packet memory 610.

Data packets are transferred as a series of words from each of the receive buffers 506a-506n to the packet memory 610 on a shared bus 606, which, in embodiments, comprises a 32 bit wide bus. When a data packet is output onto the shared bus 606, the entire packet is received and stored in the packet memory 610. The packet memory 610 immediately forwards the data packet to the transmit buffer 518 if the packet memory is otherwise empty and the transmit buffer 518 is not full. However, if there are data packets in the packet memory 610 that have not yet been output to the transmit buffer 518, or if the transmit buffer 518 is full, the packet memory 610 will store the data packet until it is instructed to write the packet by the header processor 608 in accordance with the read/write control signal 618. In embodiments, the packet memory 610 comprises any memory device or combination of memory devices suitable for storing data packets including, but not limited to, an SRAM or SDRAM device. In further embodiments, the packet memory 610 may reside internally with respect to the point-to-multipoint interface 302. Alternatively, the packet memory 610 may be externally coupled to the point-to-multipoint interface 302.

While the data packet is on the shared bus 606, the header processor 608 also reads the header bytes from the data packet. The header processor 608 uses information from the header bytes to prioritize the transfer of data packets from the packet memory 610 to the transmit buffer 518. The header processor 608 can utilize a variety of priority schemes for determining when to transfer a data packet from the packet memory 610 to the transmit buffer 518, as will be appreciated by persons skilled in the art. For example, the header processor 608 may prioritize the transfer of data packets based on a priority field in the packet header, such as an Ethernet Virtual LAN (VLAN) tag. In accordance with a priority transfer scheme, a data packet with a higher priority will be transferred to the transmit buffer 518 ahead of a data packet with a lower priority field such that certain traffic, such as voice and video, may be transmitted upstream ahead of other traffic, such as best effort traffic. Alternately, the header processor 608 delivers packets from the packet memory 610 to the transmit buffer 518 in accordance with a first-in first-out algorithm. However, these examples are not limiting, and embodiments of the present invention may utilize a variety of simple or complex priority techniques.

When the header processor has determined that a data packet is to be transferred from the packet memory 610 to the transmit buffers 518, it initiates the transfer by means of the read/write control signal 618. The data packet is then transferred to the transmit buffer 518 over a bus 612. The transmit buffer 518 temporarily stores the data packet, or a portion of the data packet, until such time as the transmitter 616 is ready to transmit the data packet over the upstream link 308. In embodiments, the transmit buffer 518 comprises a FIFO.

When the transmitter 616 is ready to transmit the data packet, the packet is transferred from the transmit buffer 618 to the transmitter 616 on a parallel word-wide bus 614. In embodiments, the parallel word-wide bus 614 is 8 bits wide. In alternate embodiments, the parallel word-wide bus 614 has a width that is some multiple of 8 bits, such as 16 b its or 32 bits. However, any width bus is contemplated.

The transmitter 616 comprises a portion of the transceiver 522 as described above in reference to FIG. 5. The transmitter 616 receives the data packet from the parallel word-wide bus 614 as a series of words, modulates the data packet, and outputs it as a serial data stream over the upstream link 308.

2. Downstream Communication

Figure 7:
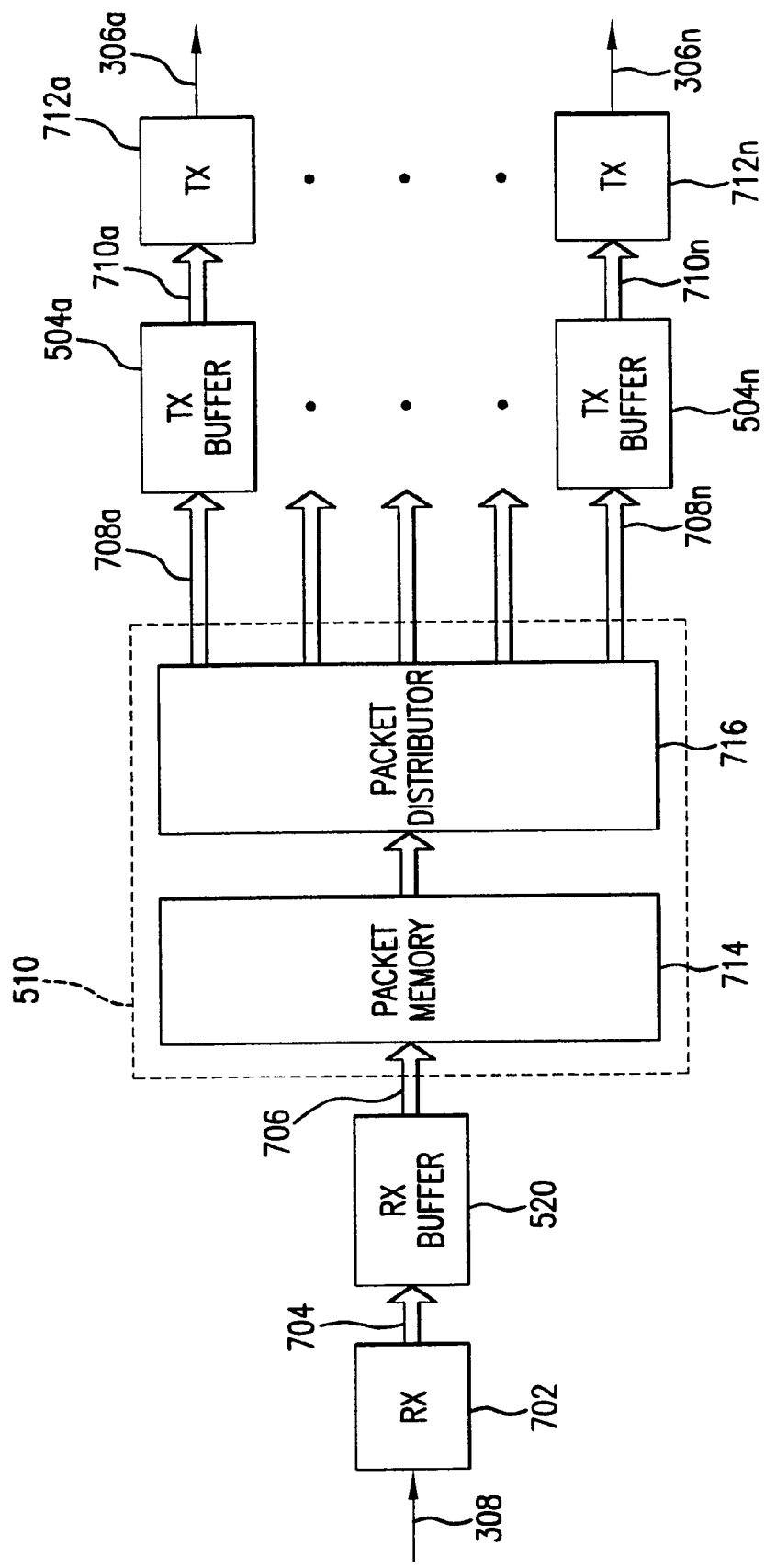
FIG. 7 depicts a downstream communication path of a point-to-multipoint network interface in accordance with embodiment of the present invention.

FIG. 7 depicts the downstream communication path of point-to-multipoint interface 302. The downstream path begins with the receipt of a data packet by the receiver 702 from upstream link 308. The receiver 702 comprises a portion of the transceiver 522 described above in reference to FIG. 5. A data packet is received by the receiver 702 as a serial data stream, demodulated, and output as a series of words on a parallel word-wide bus 704. In embodiments, the parallel word-wide bus 704 is eight bits wide. In alternate embodiments, the parallel word-wide bus 704 has a width that is some multiple of 8 bits, such as 16 bits or 32 bits. However, any size bus can be used.

The data packet output by the receiver 702 is received by a receive buffer 520, which operates to temporarily store the packet, or a portion of the packet, prior to delivery to the demultiplexer 510. Buffering serves to temporarily store overflow data when the rate at which data packets are received exceeds the rate at which data packets may be processed by demultiplexer 510. In embodiments, the receive buffer 520 may be implemented as a FIFO.

The demultiplexer 510 comprises a packet memory 714 and a packet distributor 716. The packet memory 714 stores data packets as they are output from the receive buffer 520 over a bus 706. In embodiment the packet memory 714 comprises any memory device or combination of memory devices suitable for storing data packets including, but not limited to, an SRAM or SDRAM device. In further embodiments, the packet memory 714 may reside internally with respect to the point-to-multipoint interface 302. Alternatively, the packet memory 610 may be externally coupled to the point-to-multipoint interface 302. In still further embodiments, the packet memory 714 is the same packet memory 610 utilized in the upstream communication path and described above in reference to FIG. 6.

The packet distributor 716 accesses the header of each data packet stored in the packet memory 714, and, based upon information in the packet header, transfers the data packet to one or more of a plurality of transmitters 712a-712n for transmission to one or more corresponding end user devices 304a-304n. In particular, the packet distributor 716 reads a network destination address in each packet header and maps the destination address to a hardware address (also known as a MAC address) that identifies one of the end user devices 304a-304n. In embodiments, a unique destination address, (e.g., all 1's) may identify a broadcast data packet that is to be sent simultaneously to all the end user devices 304a-304n. Additionally, other unique destination addresses may indicate that the data packet is a multicast packet that is to be sent simultaneously to some subset of all the end user devices 304a-304n.

The network destination address and corresponding hardware address for each of the end user devices 304a-304n is provided to the packet distributor 716 by the routing logic 516 depicted in FIG. 5. In embodiments, this information is acquired by the routing logic 516 through the performance of a well-known address resolution protocol (ARP) which is carried out between the routing logic 516 and the end user devices 304a-304n. The information is then stored within the packet distributor 716 and used to map destination addresses to hardware addresses. In embodiments, the information is stored in a memory within the packet distributor 716. In further embodiments, the information is stored in a content-addressable memory (CAM) within the packet distributor 716.

After the packet distributor 716 has determined which end user device 304a-304n is to receive the data packet, it outputs the data packet to the appropriate transmit buffer 504a-504n over a corresponding output bus 708a-708n. Where multiple end user devices 304a-304n are to receive the same data packet, as in a broadcast or multicast scenario, the packet distributor 716 outputs a copy of the data packet on multiple buses 708a-708n to the appropriate transmit buffers.

Figure 8:
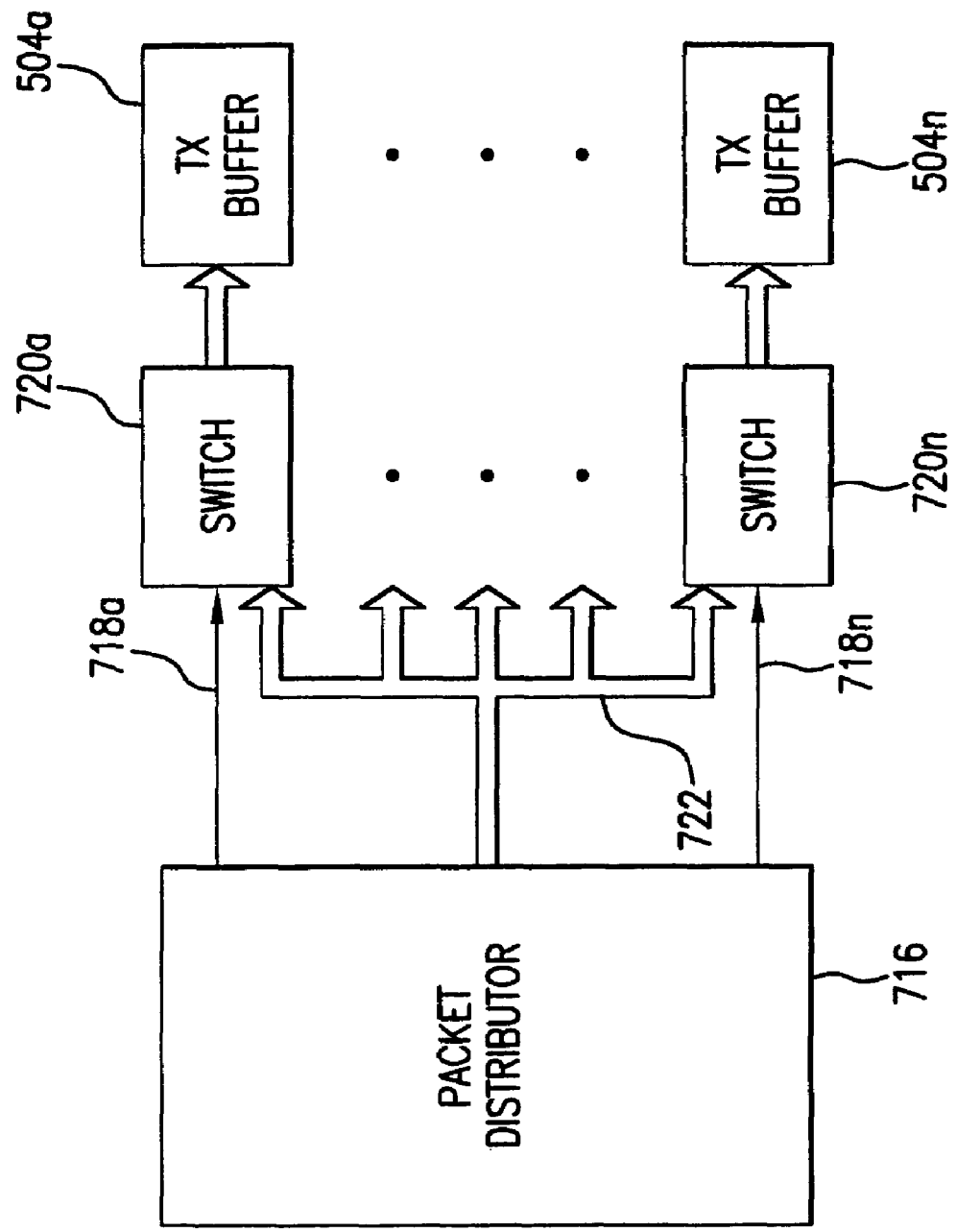
FIG. 8 depicts an example output path between a demultiplexer and a plurality of transmit buffers in a point-to-multipoint network interface in accordance with embodiments of the present invention.

FIG. 8 illustrates an alternate embodiment in which the output path between packet distributor 716 and the plurality of transmit buffers 504a-504n includes a shared bus 722. In the embodiment depicted in FIG. 8, each data packet output by the packet distributor 716 is output on the shared bus 722. The packet distributor 716 then transfers the data packet to the appropriate transmit buffer(s) 504a-504n by closing a corresponding switch 720a-720n. The packet distributor 716 controls the opening and closing of each of the switches 720a-720n by issuing a corresponding control signal 718a-718n. The configuration of FIG. 8 is advantageous in that multiple copies of the output data packet need not be output by the packet distributor 716 when the data packet is to be broadcast or multicast to a plurality of end user devices. Instead, the packet distributor 716 need only selectively close all or a subset of all switches 720a-720n to achieve a broadcast or multicast transmission.

With continued reference to FIG. 7, once a data packet has been received by one or more of the transmit buffer(s) 504a-504n, each buffer temporarily stores the data packet, or a portion of the data packet, until such time as a corresponding transmitter 712a-712n is ready to transmit the data packet over the corresponding downstream link 306a-306n. In embodiments, each transmit buffer 504a-504n comprises a FIFO.

When a transmitter 712a-712n is ready to transmit the data packet, the packet is transferred to the transmitter 712a-712n over a corresponding parallel word-wide bus 710a-710n. In embodiments, each parallel word-wide bus 710a-710n is 8 bits wide. In alternate embodiments, each parallel word-wide bus 710a-710n has a width that is some multiple of 8 bits, such as 16 bits or 32 bits.

Each transmitter 712a-712n comprises a portion of a corresponding transceiver 502a-502n, as described above in reference to FIG. 5. Each transmitter 712a-712n receives a data packet from a corresponding parallel word-wide bus 710a-710n as a series of words, modulates the data packet, and outputs it as a serial data stream over a corresponding downstream link 306a-306n.

Figure 9:
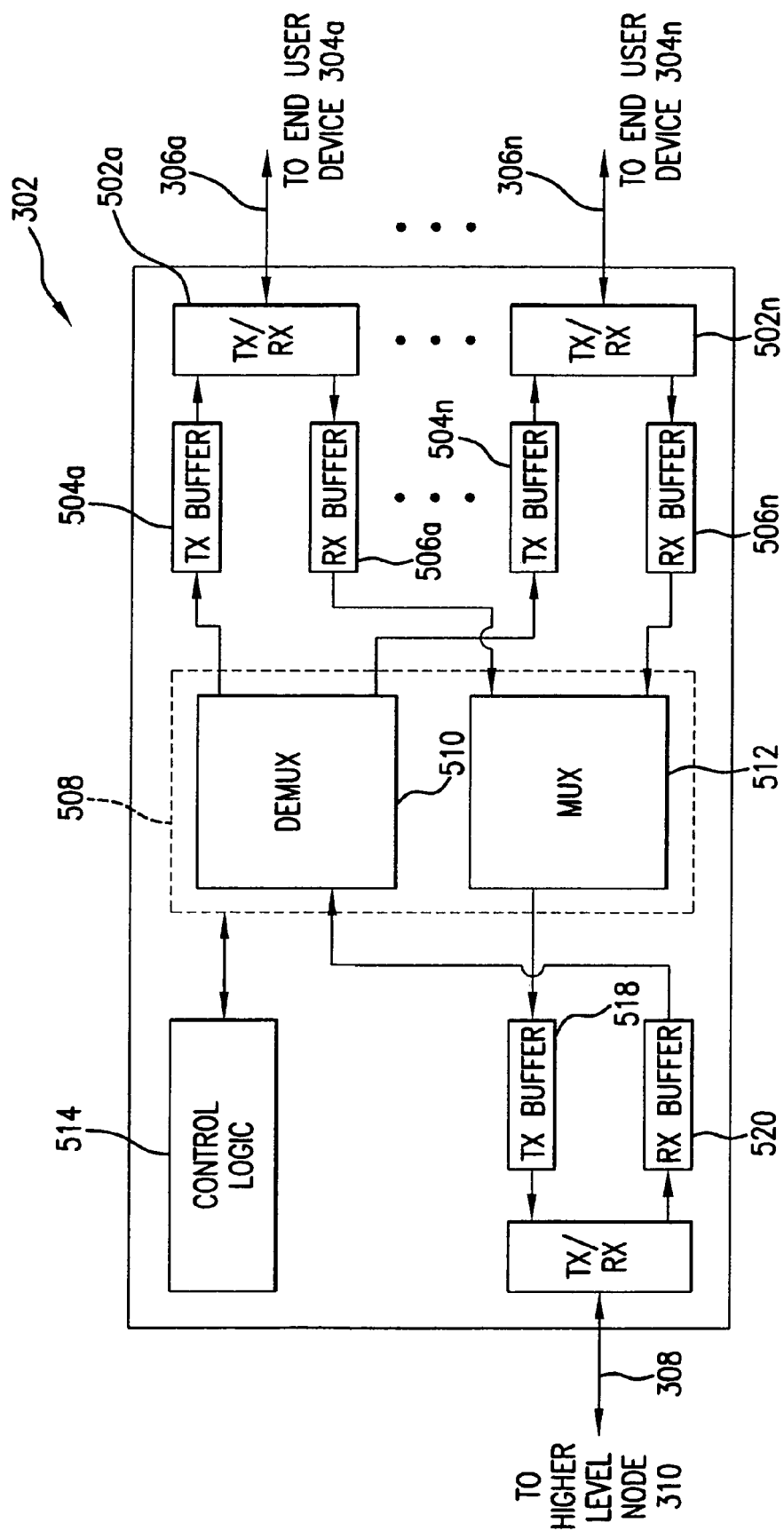
FIG. 9 illustrates a point-to-multipoint network interface in accordance with embodiments of the present invention.

FIG. 9 illustrates an alternate implementation for point-to-multipoint interface 302 in accordance with embodiments of the present invention. The implementation of FIG. 9 is different than that described in reference to FIG. 5 in that there is no routing logic 516. In the implementation of FIG. 9, routing logic 516 is not needed to determine the hardware address and corresponding network destination address for each end user device 304a-304n. Rather, it is assumed that this mapping occurs at a higher level in the access network, such as at higher level node 310, and is passed to the point-to-multipoint interface 302 as part of the header information of each received data packet. Accordingly, the design illustrated in FIG. 9 may be simpler and less expensive to implement than the embodiment of FIG. 5.

Figure 10:
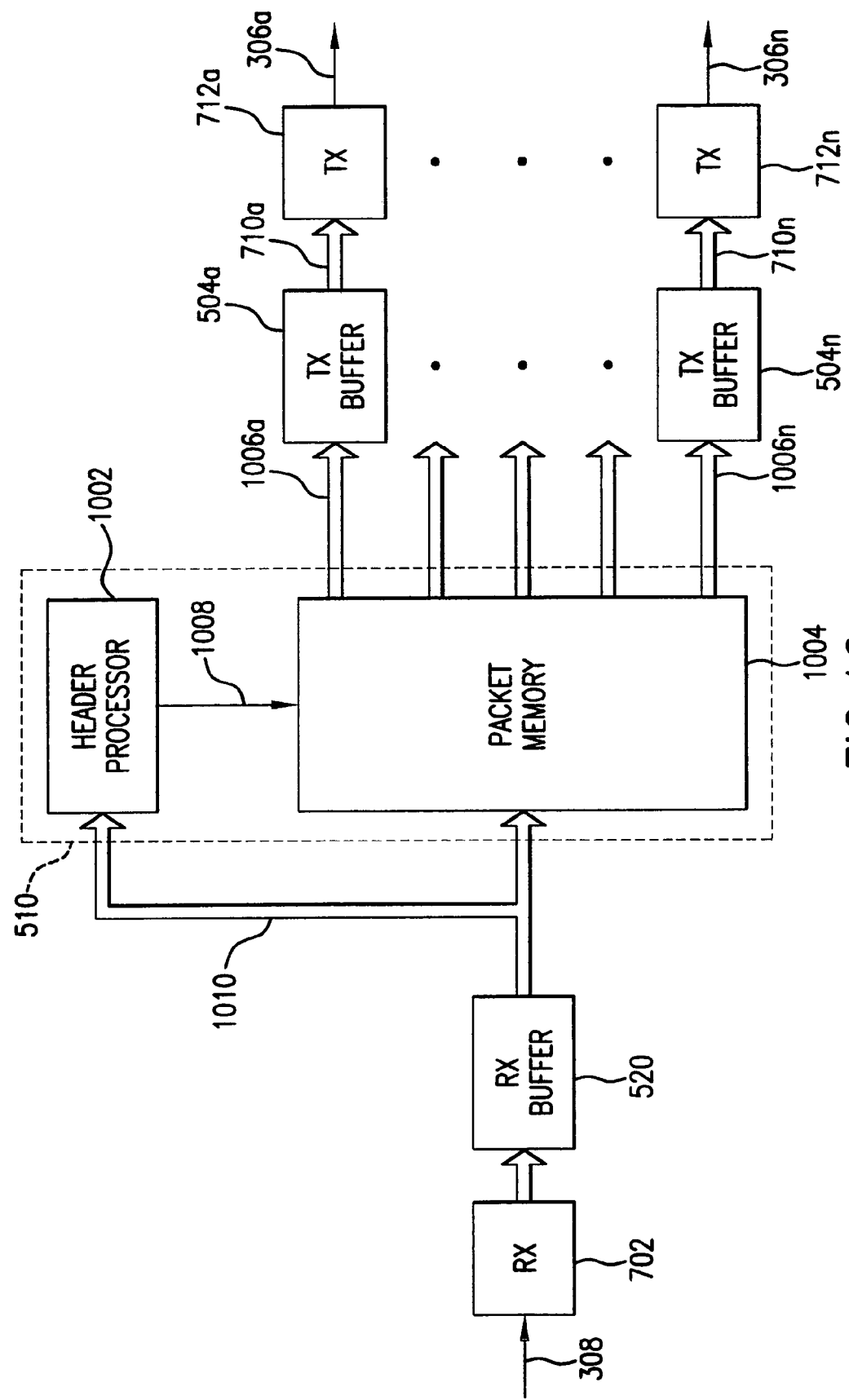
FIG. 10 depicts a downstream-communication path of a point-to-multipoint network interface in accordance with embodiments of the present invention.

FIG. 10 illustrates the downstream communication path for the point-to-multipoint interface 302 of FIG. 9. The downstream path begins with the receipt of a data packet as a serial data stream by the receiver 702. The receiver 702 demodulates the data packet and outputs it as a series of words on the parallel word-wide bus 704. The data packet is then received by a receive buffer 520, which operates to temporarily store the packet, or a portion of the packet, prior to delivery to the demultiplexer 510.

The data packet is then delivered from the receive buffer 520 to the demultiplexer 510 via a shared bus 1010. In the embodiment depicted in FIG. 10, the demultiplexer 510 comprises a header processor 1002 and a packet memory 1004, each of which has access to the shared bus 1010. In embodiments, the header processor 1002 is the same header processor 608 utilized by the upstream communication path and described above in reference to FIG. 6. The data packet is received from the shared bus 1010 and stored in the packet memory 1004. Additionally, the header processor 1002 reads the header bytes from the data packet and, based upon information in the packet header, transfers the data packet to one or more of a plurality of transmitters 712a-712n for transmission to one or more corresponding end user devices 304a-304n.

In particular, the packet header reads a hardware address, or some other indicator, in each packet header that identifies one or more of the end user devices 304a-304n. It is assumed for the purposes of this embodiment that the hardware address or indicator is determined by a higher level node within the access network, such as the higher level node 310 of FIG. 3, and stored in the packet header prior to transmission of the data packet to the point-to-multipoint interface 302. This information may be acquired by the higher level node through the performance of a well-known address resolution protocol (ARP) which is carried out between the higher level node and the end user devices 304a-304n.

After the header processor 1002 has determined which end user device 304a-304n is to receive the data packet, it sends a control signal 1008 to the packet memory 1004 which causes the data packet to be output to the appropriate transmit buffer 504a-504n over a corresponding output bus 1006a-1006n. Where multiple end user devices 304a-304n are to receive the same data packet, as in a broadcast or multicast scenario, the header processor sends a control signal 1008 to the packet memory 1004 which causes the packet memory 1004 to output a copy of the data packet on multiple buses 708a-708n to the appropriate transmit buffers.

Once a data packet has been received by one or more of the transmit buffer(s) 504a-504n, each buffer temporarily stores the data packet, or a portion of the data packet, until such time as a corresponding transmitter 712a-712n is ready to transmit the data packet over the corresponding downstream link 306a-306n. When a transmitter 712a-712n is ready to transmit the data packet, the packet is transferred to the transmitter 712a-712n over a corresponding parallel word-wide bus 710a-710n. Each transmitter 712a-712n receives a data packet from a corresponding parallel word-wide bus 710a-710n as a series of words, modulates the data packet, and outputs it as a serial data stream over a corresponding downstream link 306a-306n.

Figure 11:
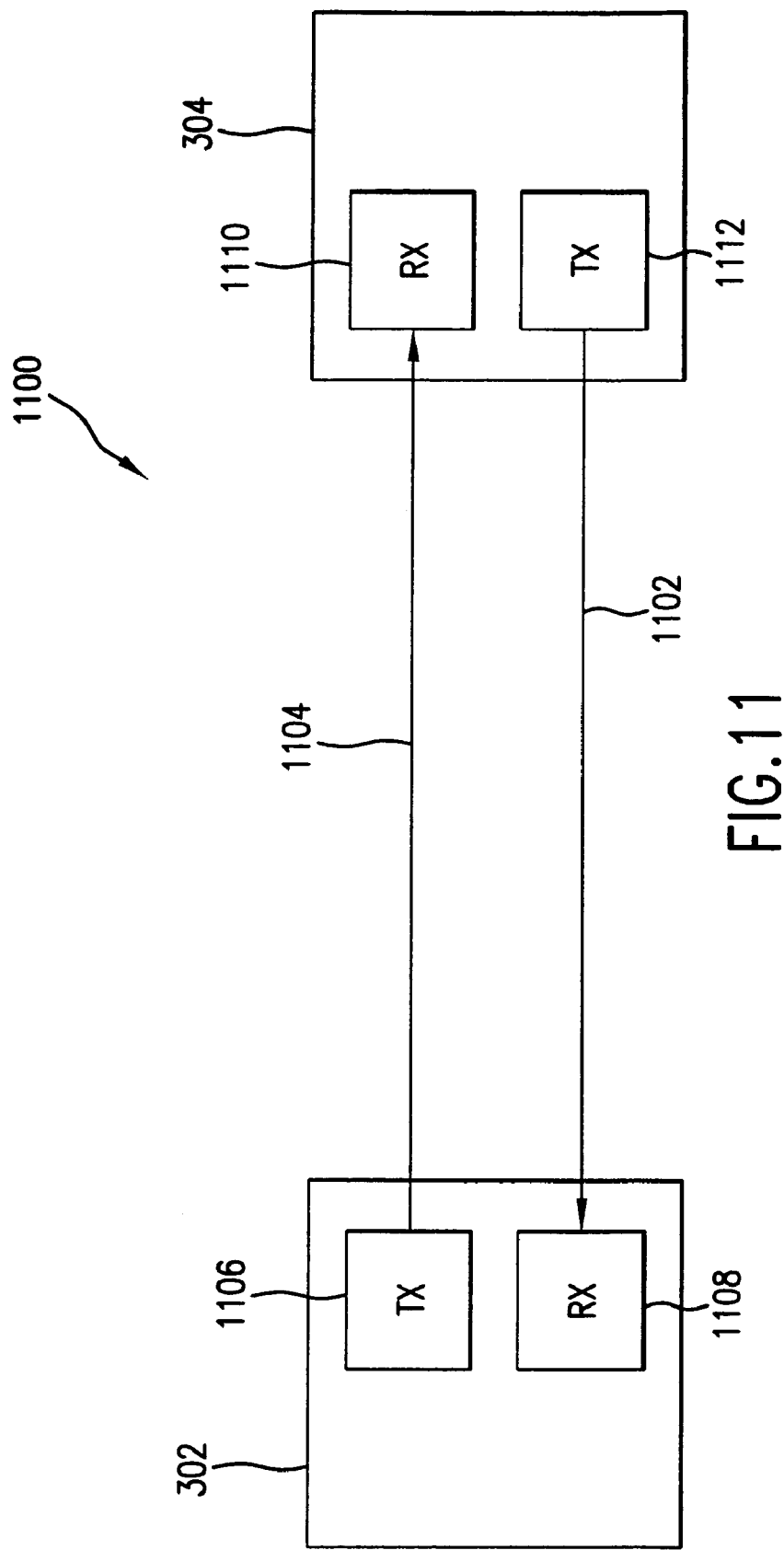
FIG. 11 illustrates a portion of an access network in accordance with embodiments of the present invention.

C. Asymmetric Communication Rates in Accordance with Embodiments of the Present Invention FIG. 11 illustrates a portion of an access network 1100 in accordance with embodiments of the present invention. The portion of the access network 1100 includes a point-to-multipoint interface 302, embodiments of which have been described in detail elsewhere herein, in communication with an end user device 304 over an upstream channel 1102 and a downstream channel 1104.

The point-to-multipoint interface 302 includes at least one downstream transmitter 1106 for transmitting data over the downstream channel 1104 and at least one upstream receiver 1108 for receiving data over the upstream channel 1102. The downstream transmitter 1106 is analogous to any of the transmitters 712a-712n described above in reference to FIGS. 7 and 10, and the upstream receiver 1108 is analogous to any of the receivers 602a-602n described above in reference to FIG. 6. Data transmitted over the downstream channel 1104 is received by a downstream receiver 1110 within end user device 304, and data received over the upstream channel 1102 is transmitted by a transmitter 1112 within end user device 304.

In accordance with embodiments of the present invention, the downstream transmitter 1106 transmits data at a rate that is substantially higher than the rate at which the upstream receiver 1108 receives data. For example, in an embodiment, the downstream transmitter 1106 transmits data at a rate of 1 Gbps, while the upstream receiver 110 (receives data at a rate of 100 Mbps. This is in contrast to conventional Ethernet switches, in which each port has identical transmit and receive rates. It is expected that such asymmetrical transmit and receive rates will nevertheless provide acceptable overall system performance in a typical access network in which upstream bandwidth requirements are substantially less than the downstream bandwidth requirements.

The asymmetrical transmit and receive rates of downstream transmitter 1106 and upstream receiver 1108 may be advantageously utilized to decrease the implementation cost of the end user device 304 and the point-to-multipoint interface 302. For example, since the upstream receiver 1108 permits data to be received at a lower rate than data transmitted on the downstream channel, the end user device 304 may be implemented with an upstream transmitter 1112 that transmits at the same rate. For example, the upstream transmitter 1112 may only be required to transmit at a rate of 100 Mbps, as opposed to a 1 Gbps rate utilized in the downstream. This results in a lower implementation cost for the upstream transmitter 1112, and therefore, for the end user device 304.

Additional cost savings may be realized on the end user side. For examples where the upstream and downstream links 1102 and 1104 are implemented using multi-mode optical fiber, the upstream transmitter 1112 may be implemented utilizing a light-emitting diode (LED) for transmitting data to the point-to-multipoint interface 302. In such an implementation, data rates of up to 100 Mbps may be achieved in the upstream channel. Were higher data rates required, an LED implementation would be unacceptable and a substantially more expensive laser-based implementation would be required.

Furthermore, because a lower upstream transmission rate is supported by the point-to-multipoint interface 302, the memory requirements for the upstream channel of the point-to-multipoint interface 302 may be reduced, resulting in a cost savings. For example, because a lower upstream transmission rate is supported, the receive buffers 506a-506n, the packet memory 610, and the transmit buffer 518 described above in reference to FIGS. 5 and 6 may be implemented using smaller components with less storage capacity than if the transmission rate in the upstream were the same as the higher downstream rate.

D. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. For example, the above-described invention is not limited to access networks and may be applicable in any data network in which information is transferred between endpoints via a point-to-multipoint interface. Accordingly, the breadth and scope of the present invention should not be limited by any of the above-described exemplary embodiments, but should be defined only in accordance with the following claims and their equivalents.

What is claimed is:

1. A point-to-multipoint network interface for transferring data packets between a plurality of lower level nodes and a higher level node, wherein each of the data packets includes a destination address, comprising:
   a plurality of upstream receivers, wherein each of said plurality of upstream receivers is configured to receive data packets from a respective one of the plurality of lower level nodes;
   a multiplexer configured to multiplex said data packets received by said plurality of upstream receivers into a first stream of data packets;
   an upstream transmitter that is configured to transmit said first stream of data packets to the higher level node regardless of destination addresses of said data packets in said first stream of data packets, wherein the upstream transmitter cannot transmit said first stream of data packets from a respective one of the plurality of lower level nodes to any other respective one of the plurality of lower level nodes;
   a downstream receiver that is configured to receive a second stream of data packets from the higher level node;
   a demultiplexer; and
   a plurality of downstream transmitters;
   wherein said demultiplexer is configured to demultiplex said second stream of data packets into individual data packets and is configured to selectively provide each of said individual data packets to one of said plurality of downstream transmitters for transmission to a respective one of the plurality of lower level nodes; and
   wherein, at least one of the lower level nodes is not an end user device.

2. The point-to-multipoint network interface of claim 1, wherein said multiplexer comprises:
   a packet memory that is configured to store said data packets received by said plurality of upstream receivers; and
   a header processor that is configured to arbitrate the storage of said data packets received by said plurality of upstream receivers in said packet memory and is configured to control the writing of said data packets stored in said packet memory to said upstream transmitter to generate said first stream of data packets.

3. The point-to-multipoint network interface of claim 2, wherein the header processor is configured to control the writing of the data packets stored in the packet memory to the upstream transmitter by reading a priority tag from a header of each of the data packets stored in the packet memory and permitting data packets with a priority tag corresponding to a higher priority to be written to the upstream transmitter before data packets with a priority tag corresponding to a lower priority.

4. The point-to-multipoint network interface of claim 1, wherein the demultiplexer comprises:
   a packet memory that is configured to store individual data packets from the second stream of data packets;
   a packet distributor that is configured to read the destination address of each of the individual data packets stored in the packet memory and, based on the destination address of each of the individual data packets, is configured to selectively route each of the individual data packets to one of the plurality of downstream transmitters for transmission to a respective one of the plurality of lower level nodes.

5. The point-to-multipoint network interface of claim 4, wherein the packet distributor is configured to map the destination address of each of the individual data packets to a corresponding hardware address identifying one of the plurality of lower level nodes.

6. The point-to-multipoint network interface of claim 5, wherein the packet distributor comprises a memory that is configured to store destination addresses and corresponding hardware addresses, and wherein the packet distributor is configured to utilize the memory to map the destination address of each of the individual data packets to a corresponding hardware address.

7. The point-to-multipoint network interface of claim 1, wherein the demultiplexer comprises:
   a packet memory that is configured to store individual data packets from the second stream of data packets;
   a header processor that is configured to read a hardware address from the header of each of the individual data packets, and, based on the hardware address of each of the individual data packets, is configured to selectively control the packet memory to output each of the individual data packets to one of the plurality of downstream transmitters for transmission to a respective one of the plurality of lower level nodes.

8. The point-to-multipoint network interface of claim 1, further comprising:
   a plurality of receive buffers coupled between the plurality of upstream receivers and the multiplexer, wherein the plurality of receive buffers are configured to temporarily store the data packets received by the plurality of upstream receivers prior to processing by the multiplexer; and
   a plurality of transmit buffers coupled between the demultiplexer and the plurality of downstream transmitters, wherein the plurality of transmit buffers are configured to temporarily store the individual data packets prior to transmission of the individual data packets by the downstream transmitters.

9. The point-to-multipoint network interface of claim 1, further comprising:
   a receive buffer coupled between the downstream receiver and the demultiplexer, wherein the receive buffer is configured to temporarily store a portion of the second stream of data packets prior to processing by the demultiplexer; and
   a transmit buffer coupled between the multiplexer and the upstream transmitter, wherein the transmit buffer is configured to temporarily store a portion of the first stream of data packets prior to transmission by the upstream transmitter.

10. A point-to-multipoint network interface of claim 1 wherein, at least one of the plurality of upstream receivers is configured to receive data packets from a particular one of the plurality of lower level nodes at a different rate than a rate at which one of the plurality of downstream transmitters is configured to transmit data packets to the particular one of the plurality of lower level nodes.

11. A point-to-multipoint network interface for transferring data packets between a plurality of lower level nodes and a higher level node, wherein each of the data packets includes a destination address, comprising:
   a plurality of upstream receivers, wherein each upstream receiver is configured to receive data packets from a respective one of the plurality of lower level nodes;
   an upstream transmitter;
   a multiplexer comprising a first packet memory that is configured to store the data packets received by the plurality of upstream receivers, and a header processor that is configured to arbitrate the storage of the data packets received by the plurality of upstream receivers in the first packet memory and is configured to control the writing of the data packets stored in the first packet memory to the upstream transmitter for transmission to the higher level node, such that the data packets stored in the first packet memory are transmitted as a first stream of data packets regardless of the destination address of the data packets stored in the first packet memory, wherein the upstream transmitter is configured such that it cannot transmit said data packets stored in the first packet memory from a respective one of the plurality of lower level nodes to any other respective one of the plurality of lower level nodes;

a downstream receiver that is configured to receive a second stream of data packets from the higher level node;

a plurality of downstream transmitters; and a demultiplexer comprising a second packet memory that is configured to store individual data packets from the second stream of data packets, and a packet distributor that is configured to read the destination address of each of the individual data packets stored in the packet memory and, based on the destination address of each of the individual data packets, is configured to selectively route each of the individual data packets to one of the plurality of downstream transmitters for transmission to a respective one of the plurality of lower level nodes; and wherein, at least one of the lower level nodes is not an end user device.

12. A method for transferring data packets between a plurality of lower level nodes and a higher level node in a network, wherein each of the data packets includes a destination address, comprising:

receiving data packets from the plurality of lower level nodes;

multiplexing the data packets received from the plurality of lower level nodes into a first stream of data packets;

transmitting the first stream of data packets to the higher level node, regardless of the destination address of the data packets in the first stream of data packets, said first stream of data packets being transmitted in a manner such that they cannot be directly transmitted from a respective one of the plurality of lower level nodes to any other respective one of the plurality of lower level nodes;

receiving a second stream of data packets from the higher level node;

demultiplexing the second stream of data packets into individual data packets; and selectively transmitting each of the individual data packets to one of the plurality of lower level nodes.

13. The method of claim 12, wherein the multiplexing step comprises:

storing the data packets received from the lower level nodes in a packet memory;

reading a priority tag from a header of each of the data packets stored in the packet memory; and permitting data packets with a priority tag corresponding to a higher priority to be transmitted to the higher level node before data packets with a priority tag corresponding to a lower priority.

14. The method of claim 12, wherein the demultiplexing step comprises:

storing individual data packets from the second stream of data packets in a packet memory;

reading the destination address from each of the individual data packets; and based on the destination address of each of the individual data packets, selectively transmitting each of the individual data packets to one of the plurality of lower level nodes.

15. The method of claim 14, wherein the demultiplexing step further comprises:

mapping the destination address of each of the individual data packets to a corresponding hardware address identifying one of the plurality of lower level nodes.

16. The method of claim 12, wherein the demultiplexing step comprises:

storing individual data packets from the second stream of data packets in a packet memory;

reading a hardware address from the header of each of the individual data packets; and based on the hardware address of each of the individual data packets, selectively transmitting each of the individual data packets to one of the plurality of lower level nodes.

* * * * *

UNITED STATES PATENT AND TRADEMARK OFFICE
CERTIFICATE OF CORRECTION

PATENT NO. : 7,660,304 B2  Page 1 of 1
APPLICATION NO. : 11/386692
DATED : February 9, 2010
INVENTOR(S) : Gummalla et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 683 days.

Signed and Sealed this

Thirtieth Day of November, 2010

David J. Kappos
*Director of the United States Patent and Trademark Office*